(12) United States Patent
Onuma et al.

(10) Patent No.: US 7,343,045 B2
(45) Date of Patent: Mar. 11, 2008

(54) IMAGE INFORMATION COMPRESSION DEVICE

(75) Inventors: Hidetoshi Onuma, Tokyo (JP); Kohichi Murohashi, Yokohama (JP)

(73) Assignee: Texas Instruments Incorporated, Dallas, TX (US)

( * ) Notice: Subject to any disclaimer, the term of this patent is extended or adjusted under 35 U.S.C. 154(b) by 735 days.

(21) Appl. No.: 10/837,193

(22) Filed: Apr. 30, 2004

(65) Prior Publication Data

US 2004/0228538 A1  Nov. 18, 2004

(30) Foreign Application Priority Data

Apr. 30, 2003 (JP) .............................. 2003-124861

(51) Int. Cl.
  *G06K 9/36* (2006.01)
  *G06K 9/46* (2006.01)
(52) U.S. Cl. ...................... 382/239; 382/248; 382/251; 382/261

(58) Field of Classification Search ................ 382/162, 382/239, 246, 248, 250, 251, 260, 261, 263, 382/264; 375/240.02, 240.03
See application file for complete search history.

(56) References Cited

U.S. PATENT DOCUMENTS

| 5,150,432 A * | 9/1992 | Ueno et al. .................. 382/250 |
| 5,617,135 A * | 4/1997 | Noda et al. ............... 348/14.12 |
| 6,763,070 B1 * | 7/2004 | Lee .......................... 375/240.2 |
| 6,944,224 B2 * | 9/2005 | Zhao et al. ............. 375/240.16 |

* cited by examiner

*Primary Examiner*—Phuoc Tran
(74) *Attorney, Agent, or Firm*—Robert D. Marshall, Jr.; W. James Brady; Frederick J. Telecky, Jr.

(57) ABSTRACT

This invention controls the code generation quantity adaptively with respect to the pattern of images and changes in the images, etc., so as to alleviate degradation in image quality, and to effectively reduce the spatial redundancy in order to provide a margin in the code quantity and to improve the overall image quality. An adaptive filter has a coefficient table memory that holds N coefficient tables, filter coefficients $F_1, F_2 \ldots F_N$ that provide different filtering characteristics, a filter coefficient selecting 46 for selecting one filter coefficient $F_k$ from filter coefficient tables and filter calculating unit performing prescribed calculations on the DCT coefficients using the selected filter coefficient $F_K$.

16 Claims, 6 Drawing Sheets

[FILTER COEFFICIENT F₁]

| 1.00, | 1.00, | 1.00, | 1.00, | 0.90, | 0.80, | 0.70, | 0.60, |
|---|---|---|---|---|---|---|---|
| 1.00, | 1.00, | 1.00, | 0.80, | 0.70, | 0.60, | 0.50, | 0.40, |
| 1.00, | 1.00, | 0.70, | 0.60, | 0.50, | 0.40, | 0.30, | 0.00, |
| 1.00, | 0.80, | 0.60, | 0.34, | 0.30, | 0.20, | 0.00, | 0.00, |
| 0.90, | 0.70, | 0.50, | 0.30, | 0.10, | 0.00, | 0.00, | 0.00, |
| 0.80, | 0.60, | 0.40, | 0.20, | 0.00, | 0.00, | 0.00, | 0.00, |
| 0.70, | 0.50, | 0.30, | 0.00, | 0.00, | 0.00, | 0.00, | 0.00, |
| 0.60, | 0.40, | 0.00, | 0.00, | 0.00, | 0.00, | 0.00, | 0.00, |

[FILTER COEFFICIENT F₂]

| 1.00, | 1.00, | 1.00, | 1.00, | 1.00, | 0.90, | 0.80, | 0.70, |
|---|---|---|---|---|---|---|---|
| 1.00, | 1.00, | 1.00, | 1.00, | 0.90, | 0.80, | 0.70, | 0.60, |
| 1.00, | 1.00, | 1.00, | 0.80, | 0.70, | 0.60, | 0.50, | 0.40, |
| 1.00, | 1.00, | 0.80, | 0.60, | 0.50, | 0.40, | 0.30, | 0.00, |
| 1.00, | 0.90, | 0.70, | 0.50, | 0.30, | 0.20, | 0.00, | 0.00, |
| 0.90, | 0.80, | 0.60, | 0.40, | 0.20, | 0.00, | 0.00, | 0.00, |
| 0.80, | 0.70, | 0.50, | 0.30, | 0.00, | 0.00, | 0.00, | 0.00, |
| 0.70, | 0.60, | 0.40, | 0.00, | 0.00, | 0.00, | 0.00, | 0.00, |

○
○
○

[FILTER COEFFICIENT F_N]

| 1.00, | 1.00, | 1.00, | 1.00, | 1.00, | 1.00, | 1.00, | 1.00, |
|---|---|---|---|---|---|---|---|
| 1.00, | 1.00, | 1.00, | 1.00, | 1.00, | 1.00, | 1.00, | 0.92, |
| 1.00, | 1.00, | 1.00, | 1.00, | 1.00, | 1.00, | 0.85, | 0.77, |
| 1.00, | 1.00, | 1.00, | 1.00, | 1.00, | 0.77, | 0.69, | .062, |
| 1.00, | 1.00, | 1.00, | 1.00, | 0.69, | .062, | 0.54, | 0.46, |
| 1.00, | 1.00, | 1.00, | 0.77, | 0.62, | 0.46, | 0.38, | 0.31, |
| 1.00, | 1.00, | 0.85, | 0.69, | 0.54, | 0.38, | 0.23, | 0.15, |
| 1.00, | 0.92, | 0.77, | 0.62, | 0.46, | 0.31, | 0.15, | 0.08, |

*FIG. 5*

[DCT COEFFICIENT]

| 588 | 0 | 65 | 0 | 0 | 0 | -39 | 0 |
|---|---|---|---|---|---|---|---|
| -39 | 65 | 65 | 0 | 39 | -39 | 0 | 0 |
| -39 | 0 | 0 | 0 | -65 | 0 | 0 | 0 |
| 0 | 117 | -65 | -65 | 0 | 0 | 39 | 0 |
| 39 | -39 | -91 | 39 | -39 | -39 | -39 | 0 |
| 39 | -65 | -39 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

$F_N$ FILTERING $(c_{ij} = a_{ij} \times b_{ij})$

[FILTER OUTPUT]

| 588 | 0 | 65 | 0 | 0 | 0 | -39 | 0 |
|---|---|---|---|---|---|---|---|
| -39 | 65 | 65 | 0 | 39 | -39 | 0 | 0 |
| -39 | 0 | 0 | 0 | -65 | 0 | 0 | 0 |
| 0 | 117 | -65 | -65 | 0 | 0 | 26 | 0 |
| 39 | -39 | -91 | 39 | -26 | -24 | -21 | 0 |
| 39 | -65 | -39 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

IMAGE INFORMATION COMPRESSION DEVICE

TECHNICAL FIELD OF THE INVENTION

The technical field of this invention is encoding and compressing image information using an orthogonal transform encoding algorithm.

BACKGROUND OF THE INVENTION

When images are digitized, the image information is usually encoded and compressed. An effective method for compressing the image information is to reduce the spatial redundancy contained in the image. These methods typically use the well-known discrete cosine transform (DCT). The input image data are divided into blocks of, for example, 8 pixels by 8 lines. A 2-dimensional DCT is applied to generate DCT transform coefficients with the correlation between pixels removed. Usually, these coefficients are quantized to integer values with finite precision (bit length) and then converted into a bit sequence of binary codes employing variable length encoding such as Huffman codes.

When a moving picture is digitized, temporal information compression is also carried out in addition to spatial information compression. In temporal information compression, the inter-frame difference between the current frame and the previous frame is encoded. Inter-frame prediction encoding with compensation for the moving portions are often adopted. In inter-frame difference encoding, a DCT of the difference image represents the difference between the current frame and the previous frame.

Usually, a prescribed standard is defined for the bit rate for sending the encoded data to the transmission line from the encoder that performs said image information compression taking into consideration the capacity of the transmission line and the characteristics of the decoder. The bit rate of the encoding output by the encoder is monitored based on the selected standard and the quantity of code generated is feedback-controlled. For example, when the moving images are transmitted at a frame rate of 15 frames/sec, the quantizing coefficients are adjusted and the code quantity for each frame is variably controlled so that it conforms to the bit rate standard for the entirety of 15 consecutive frames during the period of 1 sec. However, when a scene change takes place or when there is a significant change in the image, a huge quantity of information is instantly generated. Consequently, an insufficient quantity of code may be allotted to the later frames. This may result in a so-called frame omission. The number of frames per second must be reduced, significantly degrading the image quality. This is undesirable.

SUMMARY OF THE INVENTION

This invention solves these problems of the conventional methods by providing an image information compression device that adaptively controls the code generation quantity according to the patterns and changes in the image.

The image information compression device of this invention effectively reduces the spatial redundancy and provides tolerance in the code quantity to improve the overall image quality.

The image information compression device of this invention includes: a block division unit that divides the image data for one frame into plural transform blocks; an orthogonal transform unit that applies an orthogonal transform to plural pixel data that form the transform blocks and generates transform coefficients corresponding to plural frequency components; a quantizing unit that quantizes the transform coefficients to obtain the desired quantizing coefficients; an encoding unit that encodes the quantized transform coefficients to generate encoded data in a bit sequence; and a filter unit that filters the transform coefficients before quantizing to control the information compression rate.

In this invention, the pixel values of the image are decomposed into frequency components by an orthogonal transform. By filtering the transform coefficients according to the frequency component before quantizing, adaptive control of the information compression rate by band limiting is possible.

In this invention, the filter unit preferably has plural filter coefficients that produce different filter characteristics. One of the plural filter coefficients is selected corresponding to the prescribed parameters for use in filtering. The appropriate selection and combination of the parameters in use or preparation of filter coefficients having various filter characteristics, permits flexible adaptive filter control of image compression that preserves more color information.

In a preferred embodiment, the quantizing coefficient used in the quantizing unit, the luminance of the transform block and/or the position of the transform block in the frame are selected as parameters for the adaptive control.

When the quantizing coefficient is used as the parameter, the filter coefficients are preferably selected to limit the high-frequency component more when the value of the quantizing coefficient is larger, that is, when the quantizing resolution is coarser. As a result, relatively more codes are allotted to the low-frequency component that is important for viewing, thus minimizing degradation in the image quality. In this adaptive control a rate control unit selects the quantizing coefficients used in the quantizing unit in order to control the bit rate of the encoded data output from the encoding unit.

When the luminance value of the transform block is selected as the parameter, the filter coefficients are preferably selected to limit the high-frequency component more when the luminance value of the transform block approaches the lower limit value or the upper limit value. Excess codes are thus allotted to the intermediate luminance value region which is prone to significant degradation in the image quality. Thus the image quality is improved. In such adaptive control, a block luminance detection unit detects the luminance value of the transform block on the basis of the luminance component of the pixel data of that transform block.

When the position of the block in the frame is taken as the parameter, the filter coefficients are preferably selected to limit the high-frequency component more when the transform block belongs to the peripheral portion of a prescribed range in the frame. Excess codes are thus allotted to the region at the center of the picture where degradation in the image quality is easily visible, improving the overall image quality. In such adaptive control, a block position detector detects the position of the transform block in the frame during block division processing in the block division unit.

In another preferred embodiment of this invention, the image data for one frame is divided into transform blocks of N pixels by N lines, where N is an integer such as 8. The image data for one frame is also first divided into macroblocks each having M pixels by M lines, where M is 4N. Each of the macro-block transform blocks are further divided into 4 parts, each quadrant having N pixels by N lines. In this case, the discrete cosine transform (DCT) is preferably adopted as the orthogonal transform. Also, a discrete cosine transform (DCT) may be applied to the N×N pixel data that form the transform block to form a group of DCT coefficients of N×N DCT coefficient elements corresponding to the N×N frequency components.

In another preferred embodiment of this invention, the filter unit has the following parts: a coefficient table memory that provides the filter coefficients as coefficient tables composed of N×N filter coefficient elements; a filter coefficient selection unit for selecting one among the plural coefficient tables corresponding to the parameters; and a filter operation unit that performs the prescribed operation on the N×N DCT coefficients corresponding to the N×N filter coefficient elements of the coefficient table selected for the transform block. In this case, multiplication in preferably performed with a one-to-one relationship between the N×N DCT coefficient elements and the N×N filter coefficient elements.

In another preferred embodiment of this invention, the encoding unit is a variable length encoding means that allots a code length to each code corresponding to the generation probability.

For moving pictures, the image information compression device of this invention preferably includes the following components: a local decoding unit that decodes the quantized transform coefficients from the quantizing unit and generates the decoded image data for each frame; a motion detection unit that generates a motion vector representing the motion direction and distance for the portion that moves between two frames on the basis of the image data for the current frame and the decoded image data for the previous frame obtained from the local decoding unit; a motion compensation unit that generates the predicted image data that predicts the image of the current frame on the basis of the decoded image data for the previous frame obtained with the local decoding unit and the motion vector obtained using the motion detection unit; and a difference calculating unit that calculates the difference between the image data of the current frame and the predicted image data, and sends the difference image data representing the image of the difference to the orthogonal transform unit.

In another preferred embodiment of this invention, the local decoding unit has the following components: an inverse quantizing unit that performs inverse quantizing for the transform coefficients quantized with the quantizing unit using inverse quantizing coefficients corresponding to the quantizing coefficients; an inverse transform unit that applies an inverse transform to the transform coefficients output from the inverse quantizing unit to generate the decoded difference image data; an adder that adds the decoded difference image data obtained with the inverse transform unit and the predicted image data from the motion compensation unit to generate the decoded image data; and a frame memory that stores the decoded image data obtained with the adder in frame units. The encoding unit can preferably multiplex the motion vector from the motion detection unit with the transform coefficients quantized by the quantizing unit and encode the result.

BRIEF DESCRIPTION OF THE DRAWINGS

These and other aspects of this invention are illustrated in the drawings, in which:

FIG. 5 illustrates an example of setting values of the DCT coefficient elements in the various filter coefficients in the embodiment;

FIG. 8 illustrates an example of establishing areas in the image for changing filter characteristics; and FIG. 9 illustrates an example of establishing areas in the image for changing filter characteristics.

DETAILED DESCRIPTION OF PREFERRED EMBODIMENTS

Figure 1:
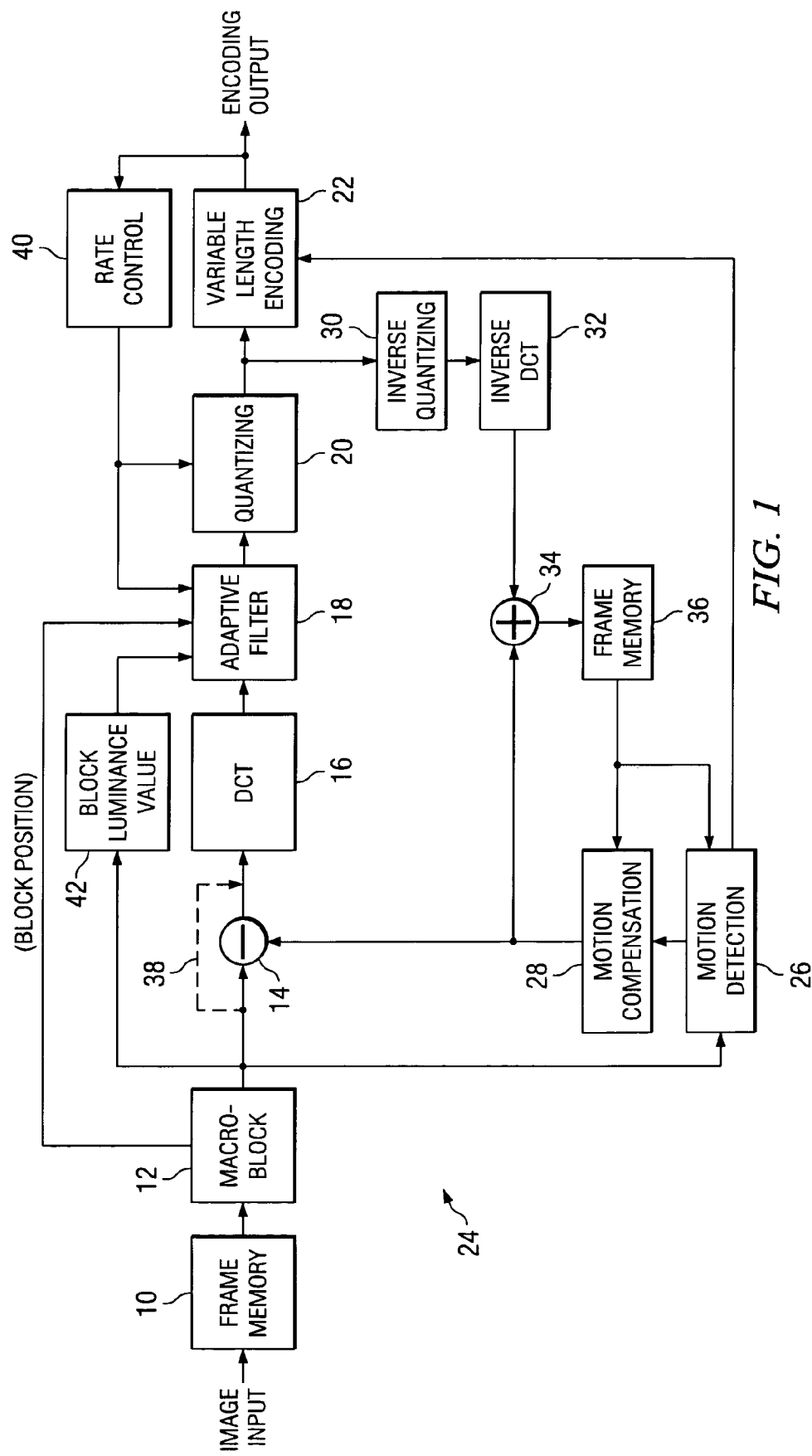
FIG. 1 is a block diagram illustrating the constitution of the image information compression device in an embodiment of this invention.

In the following, preferred embodiments of this invention will be explained with reference to appended Figures. These Figures illustrate: frame memory 10; macro-block division unit 12; difference calculation unit 14; DCT transform unit 16; adaptive filter 18; quantizing unit 20; variable length encoding unit 22; local decoding unit 24; motion detection unit 26; motion compensation unit 28; inverse quantizing unit 30; inverse DCT transform unit 32; adder 34; frame memory 36; rate control unit 40; block luminance value detection unit 42; coefficient table memory 44; filter coefficient selecting unit 46; and filter calculating unit 48.

FIG. 1 illustrates the image information compression device in one embodiment of this invention. This image information compression device is an encoder that performs information compression of moving pictures using both DCT and motion compensation.

Frame memory 10 receives a digital image signal or moving picture image data from a video camera (not shown in the Figure), for example. Macro-block division unit 12 divides the image data for one frame into plural macro-blocks from frame memory 10. In this embodiment, macro-blocks having a block size of 16 pixels by 16 lines are extracted sequentially.

The image data extracted in macro-block units by macro-block division unit 12 are sent as image data for the current frame to difference calculation unit 14 and motion detection unit 26. Difference calculation unit 14 determines the difference between macro-block units of the image data of the current frame, and corresponding macro-block units of image data of the previous frame from motion compensation unit 28 to be explained later. Difference calculation unit 14 generates the difference image data representing the difference image. DCT transform unit 16 receives this difference image data.

Figure 3:
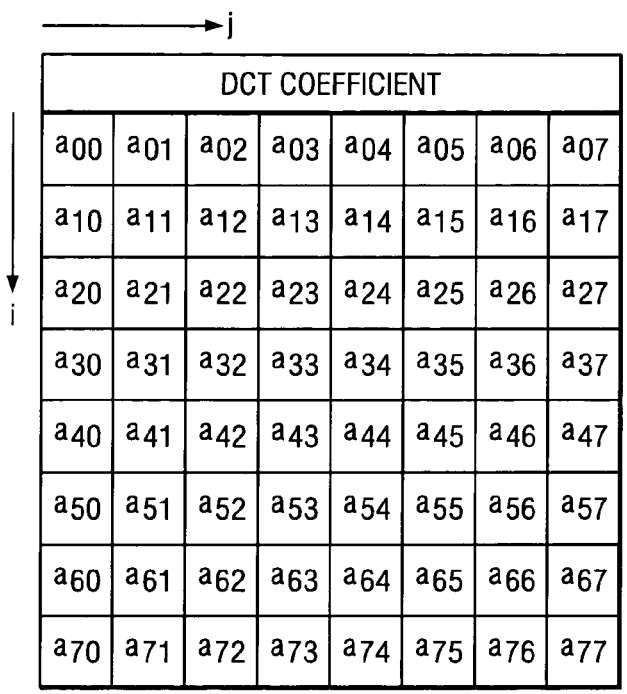
FIG. 3 illustrates the configuration of DCT coefficient elements that form a group of DCT coefficients.

DCT transform unit 16 performs quadrant-dividing for the transform blocks of 8 pixels by 8 lines as the difference image data in the input macro-block units. For the various transform blocks, DCT transform unit 16 performs a 2-dimensional DCT operation to generate the 8×8 DCT coefficient elements $[a_{ij}]$ (i=0-7, j=0-7). FIG. 3 illustrates as a square matrix of a group of these DCT coefficients. In FIG. 3, the DC element at (0,0) is $a_{00}$, and the other 63 elements are AC coefficients. Among the AC coefficients, a larger value of i corresponds to a frequency component with a high vertical fringe frequency component, and a larger value of j corresponds to a frequency component with a high horizontal fringe frequency. Consequently, the position of smaller (i,j), that is, the position in the upper-left corner, has lower frequency components. On the other hand, the position of larger (i,j), that is, the position in the lower-right corner, has higher frequency components. The DCT coefficients for each transform block output from DCT transform unit 16 are filtered by adaptive filter 18 and the filtered coefficients are supplied to quantizing unit 20.

Quantizing unit 20 quantizes the input DCT coefficients to integer values with finite precision (bit length). More specifically, each DCT coefficient element is divided by the quantizing coefficient and the remainder is rounded off. Variable length encoding unit 22 transforms each DCT coefficient quantized by quantizing unit 20 into a binary code bit sequence with variable length or entropy encoding using Huffman codes. This variable length encoded data is supplied to the transmission line. In the variable length encoding, a shorter code length is allotted to those codes having a higher appearance or generation probability. On the other hand, a longer code length is allotted to those codes having a lower generation probability.

The encoder includes local decoding unit 24, motion detection unit 26, and motion compensation unit 28 for motion compensation prediction encoding. Local decoding unit 24 includes inverse quantizing unit 30, inverse DCT transform unit 32, adder 34 and frame memory 36. Inverse quantizing unit 30 inverse quantizes the DCT coefficients quantized by quantizing unit 20 using prescribed inverse quantizing coefficients. In conventional inverse quantizing, the DCT coefficient quantized for each of the 8-pixel by 8-line transform blocks is multiplied by an inverse quantizing coefficient having a value equal to that of the quantizing coefficient, and the DCT coefficient before quantizing is recovered. Inverse DCT transform unit 32 performs an inverse DCT transform operation on the DCT coefficients for each transform block to recover the data before the DCT transform. This is the difference image data. Adder 34 adds the predicted image data from motion compensation unit 28 to the decoded difference image data from inverse DCT transform unit 32 to recover the decoded image data of the previous frame. Frame memory 36 stores this decoded image data in frame units.

Motion detection unit 26 detects the motion portion of the image in macro-block units. More specifically, motion detection unit 26 generates a motion vector representing the motion direction and distance of the motion portion between the two frames on the basis of the image data for the current frame input from macro-block division unit 12 and the decoded image data for the previous frame from frame memory 36 of local decoding unit 24. Variable length encoding unit 22 transforms the motion vector generated by motion detection unit 26 into a bit sequence of binary codes. This bit sequence is sent to the transmission path together with the DCT encoding coefficients. This bit sequence is also sent to motion compensation unit 28. Most of the encoded data from variable length encoding unit 22 are DCT code data, the quantity of motion vector component data is negligibly small.

Motion compensation unit 28 generates a predicted image data that predicts the image of the current frame in macro-block units from the decoded image data for the previous frame from frame memory 36 and the motion vector from motion detection unit 26.

In this encoder, intra-frame encoding is performed in addition to the inter-frame difference prediction encoding as a refresh on a regular base. In this case, the image data from macro-block division unit 12 bypasses difference calculation unit 14 to DCT transform unit 16 as indicated by broken line 38. Motion detection unit 26 and motion compensation unit 28 pause during the intra-frame encoding.

Rate control unit 40 makes the bit rate of the encoded data output to the transmission path from variable length encoding unit 22 conform to the standard. For example, the rate control unit 40 monitors the code generation quantity, that is, the quantity of data transmission for each frame. Rate control unit 40 selects the quantizing coefficient in quantizing unit 20 so the quantity of codes generated per second conforms to within the bit rate standard. In this embodiment, the same quantizing coefficient selection signal sent from rate control unit 40 to quantizing unit 20 is also sent to adaptive filter 18. The filter coefficient of adaptive filter 18 is selected to correspond to the quantizing coefficient used in quantizing unit 20.

In this encoder, block luminance value detection unit 42 detects the luminance value of the block region for the image data in macro-block units output from macro-block division unit 12. The block luminance value detection unit 42 determines the luminance value of each pixel, that is the average luminance value, or the sum luminance value for the entire macro-block on the basis of the luminance signal components contained in the pixel data. The block luminance value determined by block luminance detection unit 42 is sent to adaptive filter 18 as one of the parameters for selecting the filter coefficients.

Also, macro-block division unit 12 detects or determines the position of the macro-block of the transform block in the frame for the 8-pixel by 8-line transform block to which DCT is applied by DCT transform unit 16. The position of the block in the frame becomes one of the filter coefficient selecting parameters in adaptive filter 18.

Figure 2:
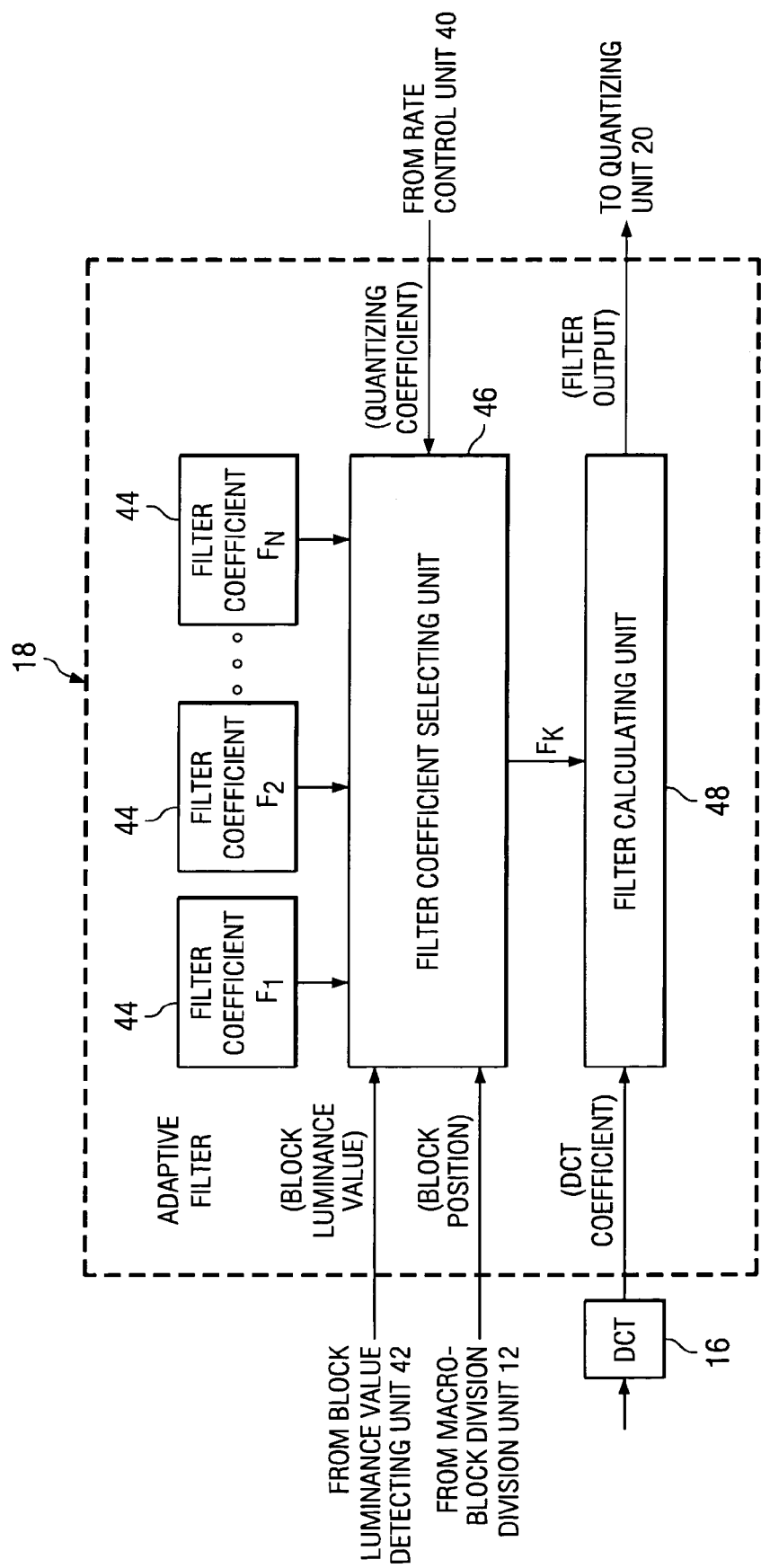
FIG. 2 is a block diagram illustrating the constitution of the filter of the image information compression device shown in FIG. 1.

FIG. 2 illustrates the parts of adaptive filter 18 in one embodiment. Adaptive filter 18 includes coefficient table memory 44, filter coefficient selecting unit 46 and filter calculating unit 48. Coefficient table memory 44 holds plural coefficient tables. For example, N (N is an integer) filter coefficients $F_1, F_2 \ldots F_N$ provide different filtering characteristics. Filter coefficient selecting unit 46 selects one filter coefficient ($F_k$) from among filter coefficients $F_1, F_2 \ldots F_N$ corresponding to the prescribed parameters. Filter calculating unit 48 performs the prescribed calculation on the DCT coefficients from DCT transform unit 16 using filter coefficient $F_K$ selected by the filter coefficient selecting unit 46.

Figure 4:
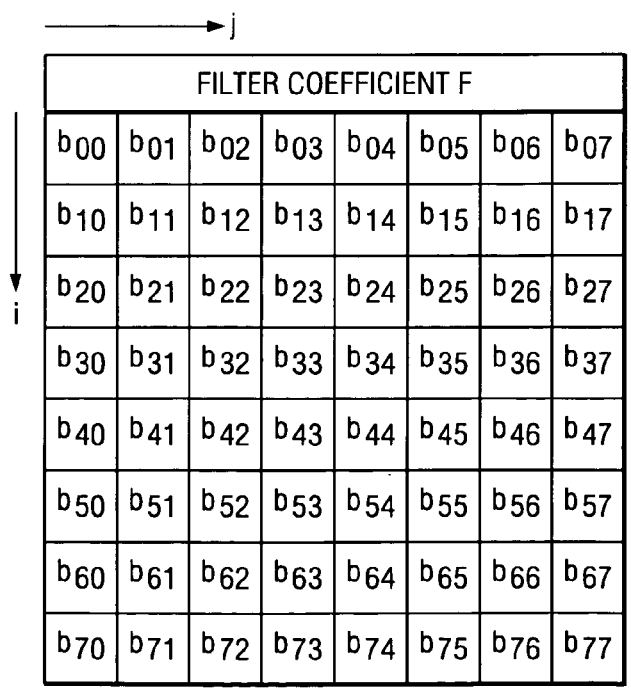
FIG. 4 illustrates the configuration of DCT coefficient elements that form the filter coefficients in the embodiment.

FIG. 4 illustrates the coefficient table of filter coefficients F. The table of filter coefficients F corresponds to the table of the DCT coefficients (FIG. 3) and also has 8×8 filter coefficient elements [$b_{ij}$] (i=0-7, j=0-7) expressed as a square matrix. More specifically, filter coefficient element $b_{00}$ of (0, 0) corresponds to DC coefficient $a_{00}$ at the same position in the DCT coefficient table. The other 63 filter coefficient elements $b_{ij}$ correspond to AC coefficients $a_{ij}$ at the same positions as the respective DCT coefficients. Consequently, the position of smaller (i,j), that is, the position in the upper left corner, corresponds to the lower frequency component. Also, the position of larger (i,j), that is, the position in the lower right corner, corresponds to the higher frequency component.

FIG. 5 illustrates a numerical example of the table contents of filter coefficients $F_1, F_2 \ldots F_N$. In this embodiment, all of filter coefficients $F_1, F_2 \ldots F_N$ provide low-pass characteristics. However, different filter coefficients have different values of the pass or limiting band, especially in the amount of removed high-frequency component. More specifically, among the filter coefficients the filter coefficient element corresponding to the position of small (i,j), that is, the upper left corner of the matrix, for the low-frequency component is set at or near the maximum value "1". However, the values set for the filter coefficient elements corresponding to the position of large (i,j), for the high-frequency component that is, the lower right corner of the matrix, are different for different filter coefficients $F_1$, $F_2$ . . . $F_N$. The smaller the filter coefficient number, the more the values there are at or near the minimum value "0" in the region near the lower right corner.

Using this scheme for setting numerical values for the filter coefficient elements in the various filter coefficients F provides a filter coefficient $F_N$ with the largest filter coefficient number providing the filter characteristics that allow best passage of the high-frequency component, not to mention the low-frequency component. The lower the filter coefficient number, the more limited the high-frequency component. The filter coefficient F1 with the lowest filter coefficient number limits the high-frequency component the most.

Filter calculating unit 48 performs the prescribed operations on the 8×8 DCT coefficient elements [$a_{ij}$] based on the corresponding 8×8 filter coefficient elements [$b_{ij}$] comprising filter coefficient $F_k$ selected by filter coefficient selecting unit 46. In this embodiment, a multiplication ($a_{ij} \times b_{ij}$) is performed by multiplying the DCT coefficient elements $a_{ij}$ by the respective filter coefficient elements $b_{ij}$. The results of multiplication $c_{ij}$ ($c_{ij} = a_{ij} \times b_{ij}$) are the corresponding DCT coefficient elements in the filter output. In an alternative embodiment, the following division ($a_{ij}/b_{ij}$) is performed for each DCT coefficient element $a_{ij}$ using the corresponding filter coefficient element $b_{ij}$. The division result $c_{ij}$ ($c_{ij} = a_{ij}/b_{ij}$) is the corresponding DCT coefficient element in the filter output.

Figure 6:
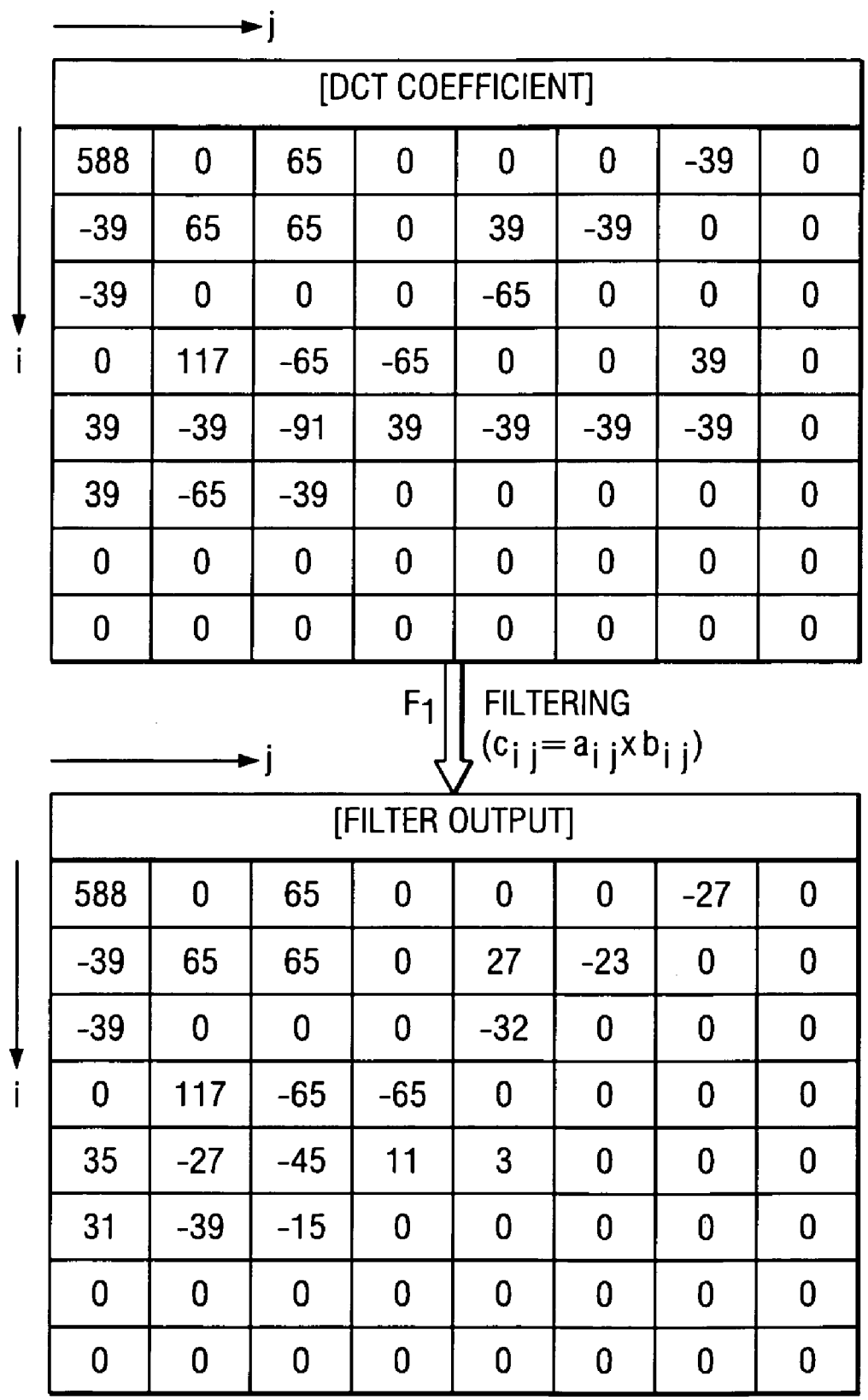
FIG. 6 illustrates the operation of filtering when a filter coefficient with the narrowest passband is selected in the embodiment.
Figure 7:
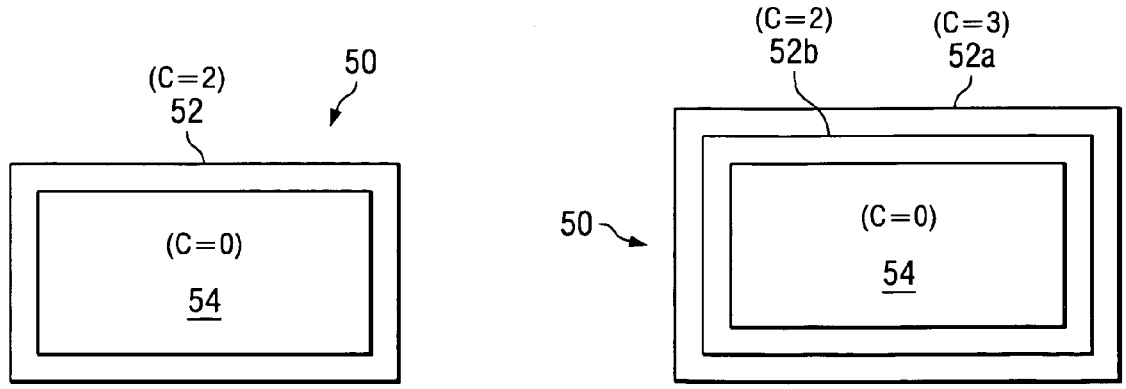
FIG. 7 illustrates the operation of filtering when a filter coefficient with the broadest passband is selected in the embodiment.

FIG. 6 shows a numerical example of the DCT coefficient elements [$a_{ij}$] (i=0-7, j=0-7) for a certain DCT coefficient. Also, it shows the filter calculation result (filter output) of filter calculating unit 48 when filter coefficient $F_1$ is selected by filter coefficient selecting unit 46. FIG. 7 shows the filter calculation result (filter output) of filter calculating unit 48 when filter coefficient FN is selected by filter coefficient selecting unit 46 for the same DCT coefficient as that shown in FIG. 6.

As shown in FIG. 6 when filter coefficient $F_1$ is selected, most of the DCT coefficient elements corresponding to the low-frequency component in the positions of small (i,j) in the upper left corner of the matrix retain values at or near the original value even after filtering. On the other hand, almost all of the DCT coefficient elements corresponding to the high-frequency component in the positions of large (i,j) in the lower right corner of the matrix are filtered to become the minimum value "0".

As shown in FIG. 7 when filter coefficient $F_1$ is selected, most of the DCT coefficient elements corresponding to the low-frequency component in the positions of small (i,j) in the upper left corner of the matrix retain values at or near the original value even after filtering. For some of the DCT coefficient elements corresponding to the high-frequency component in the positions of large (i,j) in the lower right corner of the matrix also retain a significant value after filtering.

Thus, upon filtering the same DCT coefficient with filter coefficient $F_1$ and with filter coefficient $F_N$ both allow good passage of the low-frequency component. For the high-frequency component, using filter coefficient $F_1$ provides more restrictive band limits than that using filter coefficient FN, and the number of codes generated becomes smaller accordingly. Although the degree varies, such a difference in filter characteristics exists between any filter coefficients having different filter coefficient numbers.

Filter coefficient selecting unit 46 makes use of the following three parameters for selecting the filter coefficients: 1) a quantizing coefficient selection signal provided by rate control unit 40; 2) a block luminance detection value provided by block luminance value detection unit 42; and 3) an in-frame block position signal provided by macro-block division unit 12.

According to the algorithm in this embodiment, filter coefficient selecting unit 46 sets filter number K0 as the default selection candidate filter coefficient. Filter coefficient selecting unit 46 makes three corrections starting from the candidate K0, which are K1, K2 and K3, using the filter number correction values A, B and C corresponding to the three respective selection parameters. The final candidate number K3 is taken as number K of filter coefficient $F_K$ for use (selected coefficient). For example, as filter number K0 of the selected candidate filter coefficient, when N (maximum value) is taken as the default value, the number correction is performed by means of subtraction according to Equations 1, 2, 3. Of course, in following listed Equations 1, 2, 3, filter number correction values A, B, C may be interchanged.

| | |
|---|---|
| K1 = K0 − A | (1) |
| K2 = K1 − A | (2) |
| K3 = K2 − A | (3) |
| K = K3 (where 1 ≦ K) | (4) |

The method of filter coefficient selection in filter coefficient selecting unit 46 according to the three parameters will now be explained.

The quantizing coefficient selection signal from rate control unit 40 is intrinsic in the selection of the quantizing coefficient used in the quantizing algorithm in quantizing unit 20. Here, the quantizing coefficient is a parameter that defines the quantizing resolution. It has value Q that can be selected in the range of, for example, $1 \leq Q \leq 31$ (5-bit value). The smaller the quantizing coefficient value Q, the higher the quantizing precision and the greater the code quantity. Conversely, the larger the quantizing coefficient value Q, the lower the quantizing precision and the less the code quantity. Rate control unit 40 monitors the quantity of coded data sent to the transmission path. Based on the bit rate standard, rate control unit 40 assigns a smaller quantizing coefficient when the code quantity that can be allotted to the current frame is sufficient, and assigns a larger quantizing coefficient when the code quantity that can be allotted is insufficient. When scene changes or a significant motion variation takes place, a large quantity of codes are generated and the quantity of codes that can be allotted to a later frame becomes insufficient. Consequently, the bit rate control increases the quantizing coefficient value Q.

Filter coefficient selecting unit 46 receives the quantizing coefficient selection signal from rate control unit 40 and reads or recognizes the quantizing coefficient value Q to be used in quantizing unit 20. Filter coefficient selecting unit 46 selects filter coefficients so that A=0 for $1 \leq Q \leq 3$ and A=Q/4 (with the remainder being cut off) when $4 \leq Q \leq 31$, and calculation is performed using the Equation 1. Equations 4 and 5 are used in calculation based upon the quantizing coefficient value Q

| $1 \leq Q \leq 3$ | K1 = K0 | (4) |
|---|---|---|
| $4 \leq Q \leq 31$ | K1 = K0 − Q/4 | (5) |

According to this algorithm, when the quantizing coefficient value Q is small and the code quantity that can be allotted to the current frame is sufficient, filter coefficient selecting unit 46 tends to select a coefficient filter with a relatively high filter number providing broad passband filter characteristics and a sufficient code quantity is allotted to all of the spatial frequencies of the image. On the other hand, when quantizing coefficient value Q is large and the code quantity that can be allotted to the current frame is insufficient, filter coefficient selecting unit 46 tends to select a coefficient filter with a relatively low filter number providing narrow passband filter characteristics with an emphasis placed on the low-frequency region and codes are mainly allotted to the low-frequency component that is more important for vision. This avoids frame omission and the overall image quality of the moving pictures is improved.

Block luminance value detection unit 42 produces the block luminance detection value representing the luminance value L of the transform block corresponding to the DCT coefficient for filtering. This may have an 8-bit value having a range of $0 \leq L \leq 255$. Usually, human vision has a much higher sensitivity to luminance than to color. However, the sensitivity falls for very dark portions and extremely bright portions. Taking into consideration such human vision characteristics, filter coefficient selecting unit 46 selects the value of B, for example, to be 2 when L<44 or 210<L, and the value of B to be 1 when $45 \leq L < 64$ or $200 < L \leq 209$, and the value of B to be 0 when $64 \leq L \leq 200$. Then, the Equation 2 is used in calculation. Equations 6, 7, 8 are used in calculation based on the block luminance detection value L.

| L < 44 and 210 < L | K2 = K1 − 2 | (6) |
|---|---|---|
| $45 \leq L < 64$ and $200 < L \leq 209$ | K2 = K1 − 1 | (7) |
| $4 \leq L \leq 200$ | K2 = K1 | (8) |

With this algorithm, a coefficient filter with a relatively low filter number providing narrow passband filter characteristics with emphasis put on the low-frequency region is selected for extremely bright regions or extremely dark regions in the image. This reduces the code quantity corresponding to visual sensitivity. On the other hand, for the region that is neither too bright nor too dark where visual sensitivity is high, a coefficient filter with a relatively high filter number providing broad passband filter characteristics is selected. This allots sufficient code quantity to this region. As a result, the overall image quality of the image or moving picture is improved.

Macro-block division unit 12 produces information of the position of the block in the frame representing the transform block position in the frame corresponding to the DCT coefficient for filtering. This is specified in macro-block units. Usually, for human eyes, degradation in image quality is more noticeable for the central portion of the image than the peripheral portion. Filter coefficient selecting unit 46 uses the Equation 3 according to this vision characteristic as shown in FIG. 8, for example. Filter coefficient selecting unit 46 sets the filter number correction value C=2 when the position of the transform block in the frame is in peripheral area 52 within a prescribed range, for example, within 16 pixels) of the edge of image 50. Filter coefficient selecting unit 46 sets the filter number correction value C=0 when the position is within central area 54 inside the peripheral area 52. Filter coefficient selecting unit 46 uses Equations 9 and 10 corresponding to the position of the block in the frame.

| Position in the peripheral area | K3 = K2 − 2 | (9) |
|---|---|---|
| Position in the central area | K3 = K2 | (10) |

According to this algorithm, a coefficient filter with a relatively low filter number providing narrow passband filter characteristics is selected for the peripheral portion of the image where degradation in image quality is less noticeable, so as to reduce the code quantity. On the other hand, a coefficient filter with a relatively high filter number providing broad passband filter characteristics is selected for the central region of the image where degradation in image quality can be noticed more easily, so as to allot sufficient code quantity to this region. As a result, the overall image quality of the image or moving picture is improved.

In an alternative embodiment shown in FIG. 9, peripheral area 52 is divided into two regions 52*a* and 52*b*. For example, filter coefficient selecting unit 46 selects C=3 for outer peripheral area 52*a*, C=2 for inner peripheral area 52*b*, and C=0 for central area 54. In this way, correction of the filter coefficient numbers can be performed just as described above.

As explained above, the encoder of this embodiment includes adaptive filter 18 between DCT transform unit 16 and quantizing unit 20. Filtering is performed with restricted band limits when the quantity of codes or bits that can be allotted to the current frame is small. Codes are allotted preferentially to the low-frequency component that is more important for vision. As a result, it is possible to prevent degradation in the overall image quality for the moving picture. Also, filtering with narrow band limits is performed for the portion that is less important for vision from the luminance and the position of the various portions in the image, and the excess codes are allotted to the other portion that is more important to vision. As a result, the overall image quality of the entire image or moving picture is improved.

In the aforementioned embodiment, quantizing unit 20 uses three parameters are used to select the filter coefficient in adaptive filter 18. These are the quantizing coefficient, the luminance of the transform block and the position in the frame. However, these parameters can be used in any combination. Also, other parameters may be used. In the aforementioned embodiment, DCT is used as the orthogonal transform. However, other orthogonal transform systems may also be adopted. Also, this embodiment is merely an example of the encoder system and the constitution of the various parts, and various modifications and replacements may be adopted. Of course, this invention may also be adopted in information compression of still images in addition to information compression of moving pictures.

The image information compression device of this invention controls the quantity of codes generated adaptively in response to the image pattern, changes, etc. It is possible to alleviate degradation in the image quality. Also, it is possible to effectively reduce spatial redundancy, to provide a margin in the code quantity, and to improve the overall image quality.

What is claimed is:

1. An image information compression device comprising:
   a block division unit that divides the image data for one frame into plural transform blocks;

an orthogonal transform unit that applies an orthogonal transform to plural pixel data, forms transform blocks and generates transform coefficients corresponding to plural frequency components;

a quantizing unit that quantizes said transform coefficients to obtain the desired quantizing coefficients;

an encoding unit that encodes said quantized transform coefficients to generate encoded data in a bit sequence; and a filter unit that filters said transform coefficients before quantizing to control the information compression rate, said filter unit selecting a set of filter coefficients corresponding to the quantizing coefficient used in said quantizing unit.

2. The image information compression device of claim 1, wherein:
said filter unit selects said set of filter coefficients that limits the high-frequency component more when said quantizing coefficient has a higher value.

3. The image information compression device of claim 1, wherein;
said filter unit selects said set of filter coefficients further corresponding to the luminance of said transform block.

4. The image information compression device of claim 1, wherein:
said filter unit selects said set of filter coefficients further corresponding to whether the position of said transform block is in a peripheral portion or in a central portion of said frame.

5. The image information compression device of claim 1, wherein:
said filter unit selects said set of filter coefficients further corresponding to the quantizing coefficient used in said quantizing unit and to the luminance value of said transform block.

6. The image information compression device of claim 1, wherein:
said filter unit selects said set of filter coefficients further corresponding to the quantizing coefficient used in said quantizing unit and whether the position of said transform block is in a peripheral portion or in a central portion of said frame.

7. The image information compression device of claim 1, wherein:
said filter unit selects said set of filter coefficients further corresponding to the luminance value of said transform block and the position of said transform block in said frame.

8. The image information compression device of claim 1, wherein:
said filter unit selects said set of filter coefficients further corresponding to the quantizing coefficient used in said quantizing unit, the luminance value of said transform block and the position of said transform block in said frame.

9. An image information compression device comprising:
a block division unit that divides the image data for one frame into plural transform blocks;
an orthogonal transform unit that applies an orthogonal transform to plural pixel data, forms transform blocks and generates transform coefficients corresponding to plural frequency components;
a quantizing unit that quantizes said transform coefficients to obtain the desired quantizing coefficients;
an encoding unit that encodes said quantized transform coefficients to generate encoded data in a bit sequence; and
a filter unit that filters said transform coefficients before quantizing to control the information compression rate, said filter unit selecting a set of filter coefficients corresponding to the luminance of said transform block.

10. The image information compression device of claim 9, wherein:
said filter unit selects said set of filter coefficients that limits the high-frequency component more as the luminance value of said transform block approaches the lower limit value or the upper limit value.

11. The image information compression device claim 9, further comprising:
a block luminance detection unit that detects the luminance value of said transform block on the basis of the luminance component of the pixel data that form said transform block.

12. The image information compression device of claim 9, wherein:
said filter unit selects said set of filter coefficients further corresponding to whether the position of said transform block is in a peripheral portion or a central portion of said frame.

13. The image information compression device of claim 9, wherein:
said filter unit selects said set of filter coefficients further corresponding to the quantizing coefficient used in said quantizing unit and to the luminance value of said transform block.

14. An image information compression device comprising:
a block division unit that divides the image data for one frame into plural transform blocks;
an orthogonal transform unit that applies an orthogonal transform to plural pixel data, forms transform blocks and generates transform coefficients corresponding to plural frequency components;
a quantizing unit that quantizes said transform coefficients to obtain the desired quantizing coefficients;
an encoding unit that encodes said quantized transform coefficients to generate encoded data in a bit sequence; and
a filter unit that filters said transform coefficients before quantizing to control the information compression rate, said filter unit selecting a set of filter coefficients corresponding to whether the position of said transform block is in a peripheral portion or a central portion of said frame.

15. The image information compression device of claim 14, wherein:
said filter unit selects said set of filter coefficients that limits the high-frequency component more when said transform block belongs to said peripheral portion within a prescribed range in said frame.

16. The image information compression device of claim 14, further comprising:
a block position detection means that detects whether the position of said transform block is in a peripheral portion or in a central portion of said frame during block division processing in said block division unit.

* * * * *